(12) United States Patent
Pisaris-Henderson et al.

(10) Patent No.: US 8,700,469 B2
(45) Date of Patent: Apr. 15, 2014

(54) SYSTEM AND METHOD FOR DELIVERING ADVERTISING WITH ENHANCED EFFECTIVENESS

(75) Inventors: Craig A. Pisaris-Henderson, Fort Myers, FL (US); Anthony A. Garcia, Fort Myers, FL (US)

(73) Assignee: Apple Inc., Cupertino, CA (US)

( * ) Notice: Subject to any disclaimer, the term of this patent is extended or adjusted under 35 U.S.C. 154(b) by 783 days.

(21) Appl. No.: 11/369,085

(22) Filed: Mar. 6, 2006

(65) Prior Publication Data
US 2007/0208610 A1    Sep. 6, 2007

(51) Int. Cl.
*G06Q 30/00* (2012.01)

(52) U.S. Cl.
USPC .................................. 705/14.71; 705/14.73

(58) Field of Classification Search
USPC ......... 705/1–30; 715/800–830; 707/500–600; 345/700–800
See application file for complete search history.

(56) References Cited

U.S. PATENT DOCUMENTS

| | | |
|---|---|---|
| 4,672,575 A | 6/1987 | Stephans |
| 4,841,291 A | 6/1989 | Swix et al. |
| 4,984,152 A | 1/1991 | Muller |
| 5,157,768 A | 10/1992 | Hoeber et al. |
| 5,179,656 A | 1/1993 | Lisle |
| 5,347,628 A | 9/1994 | Brewer et al. |
| 5,544,295 A | 8/1996 | Capps |
| 5,559,943 A | 9/1996 | Cyr et al. |
| 5,559,947 A | 9/1996 | Wugofski |
| 5,559,948 A | 9/1996 | Bloomfield et al. |
| 5,572,643 A | 11/1996 | Judson |
| 5,596,694 A | 1/1997 | Capps |
| 5,617,526 A | 4/1997 | Oron et al. |
| 5,710,897 A | 1/1998 | Schneider |
| 5,737,619 A | 4/1998 | Judson |
| 5,740,549 A | 4/1998 | Reilly et al. |
| 5,801,698 A | 9/1998 | Vection et al. |

(Continued)

OTHER PUBLICATIONS

WWW Plug-Ins, Written by Mark R. Brown with Simeon M. Greene, Galen Grimes, John Jung, Bernie Roehl, David Wall, Joe Weber, 1996. 21pps.

(Continued)

*Primary Examiner* — Sun Li
(74) *Attorney, Agent, or Firm* — Novak Druce Connolly Bove + Quigg LLP

(57) ABSTRACT

A method for generating an advertisement impression which moves a selected instance of advertisement content in conjunction with a mouse pointer on a client rendering system includes defining, in a placement database, a plurality of instances of advertisement content. Each instance of advertisement content is associated with an advertisement category, a financial parameter, and response data. A selected instance of advertisement content is selected from the placement database. The selected instance of advertisement content is one of the plurality of instances of advertisement content that is associated with an advertisement category meeting selection criteria and a financial parameter meeting selection criteria. The selected instance of advertisement content is combined with pointer tracking instructions to generate the advertisement impression. The pointer tracking instructions are operative on the client rendering system to: i) move the selected instance of advertisement content in response to detecting user movement of the mouse pointer; ii) receive an indication of user response to the selected instance of advertisement content; and iii) in accordance with the response data associated with the selected instance of advertisement content perform one of: a) initiate a URL request to the redirect URL; and b) render the response content on the client rendering system.

24 Claims, 11 Drawing Sheets

(56) References Cited

U.S. PATENT DOCUMENTS

| | | | |
|---|---|---|---|
| 5,841,970 | A | 11/1998 | Tabuki |
| 5,923,327 | A | 7/1999 | Smith et al. |
| 5,945,989 | A | 8/1999 | Freishtat et al. |
| 5,959,624 | A | 9/1999 | Johnston, Jr. et al. |
| 5,969,708 | A | 10/1999 | Walls |
| 5,987,134 | A | 11/1999 | Shin et al. |
| 5,990,888 | A | 11/1999 | Blades et al. |
| 6,065,057 | A | 5/2000 | Rosen et al. |
| 6,239,795 | B1 | 5/2001 | Ulrich et al. |
| 6,295,061 | B1* | 9/2001 | Park et al. ............. 715/764 |
| 6,583,798 | B1* | 6/2003 | Hoek et al. ............. 715/822 |
| 6,865,719 | B1* | 3/2005 | Nicholas, III ........... 715/856 |
| 2002/0010626 | A1* | 1/2002 | Agmoni .................. 705/14 |
| 2002/0154159 | A1 | 10/2002 | Day |
| 2003/0220866 | A1 | 11/2003 | Pisaris-Henderson et al. |
| 2003/0234819 | A1 | 12/2003 | Daly |
| 2004/0093327 | A1 | 5/2004 | Anderson et al. |
| 2004/0133471 | A1 | 7/2004 | Pisaris-Henderson et al. |
| 2004/0162757 | A1 | 8/2004 | Pisaris-Henderson et al. |
| 2004/0186778 | A1* | 9/2004 | Margiloff et al. ........ 705/14 |
| 2005/0076051 | A1 | 4/2005 | Corobus et al. |
| 2005/0125354 | A1 | 6/2005 | Pisaris-Henderson et al. |
| 2005/0154717 | A1 | 7/2005 | Watson et al. |
| 2005/0216547 | A1 | 9/2005 | Foltz-Smith |
| 2005/0216866 | A1 | 9/2005 | Rosen et al. |
| 2005/0222910 | A1* | 10/2005 | Wills .................... 705/22 |

OTHER PUBLICATIONS

The Java Language Environement, May 1995 White Paper by James Gosling and Henry McGilton, 65pps.

Using Microsoft Internet Explorer, Peter Kent, 1995, Que corporation, p. 71.

* cited by examiner

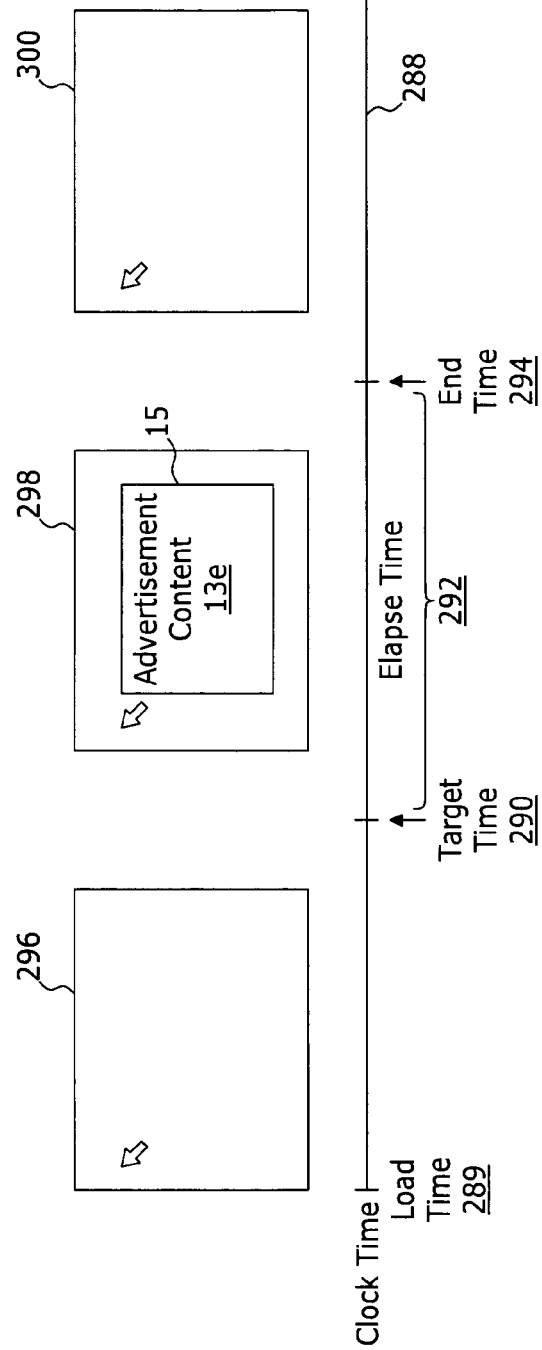

| Assessment Basis 60a |
|---|
| Assessment per Rendering |
| Assessment per Response |
| Assessment per Conversion |
| Assessment per Other Event |

AND / OR

| Base Charge 60b | | |
|---|---|---|
| Fixed Base Charge 302 | Bid Amount | Other Defined Functions |
| Variable Base Charge 304 | Increasing CPA | |
| | Decreasing CPA | |
| | Function of Conversion Revenue | |
| | Other Defined Functions | |

AND / OR

| Other Factors (optional) 60c |
|---|
| Discount or Premium Based on Advertisement Delivery System |
| Discount or Premium Based on Customer Demographics or Behavior Patterns |
| Discount or Premium Based on Time Between Rendering and Conversion |
| Other Discount or Premium Factors |

| Query Parameters 57 |
|---|
| Search Parameter 57a |
| Geography/Location Parameter 57b |
| Date/Time Parameter 57c |
| Consumer Demographic Parameters 57d |
| Consumer Behavioral Parameters 57e |

Figure 15

SYSTEM AND METHOD FOR DELIVERING ADVERTISING WITH ENHANCED EFFECTIVENESS

TECHNICAL FIELD

The present invention relates to a system and method for providing advertising and, more particularly, to a system and method for delivering advertising content for display in union with a mouse pointer or cursor.

BACKGROUND OF THE INVENTION

Placement of advertising within web published media content (e.g. web pages) has existed for several years. A common type of web page advertising exists in the form of "banner advertisements". Banner advertisements are typically placed on the top, sides, and/or bottom of the viewing area of a web page.

Banner advertisements are generally square or rectangular boxes provided with some combination of graphics and/or text directed to the product or service being advertised. Banner advertisements usually include a "hyperlink" to a redirect URL. Users who click on the advertisement are linked to the web site of the manufacturer of the product or service being advertised, or to some other web site which provides additional information about the product or service.

The most simple method for placement of banner advertisements within a web page is for the publisher to simply hard code an advertiser provided banner advertisement within the HTML web page. When a client system establishes an HTTP session to the publisher's web server, the returned web page includes both the web page document content and the embedded banner advertisement. When the banner advertisement is hard coded, all viewers of the web page see the same banner advertisement.

An alternative dynamic system is disclosed in US Published Application 2004/0093327 to Anderson et al. Anderson et al. discloses a system wherein the web published media includes a "space" for an advertisement and, upon a client making a content request to the publisher's web server, the web server makes an advertisement request to an advertising system. The advertising system, which has analyzed the content of the published media, selects an advertisement relevant to the published media and returns the advertisement to the web server for placement within the available space. The webpage that includes the dynamically placed banner advertisement embedded therein is returned to the client making the request.

Again, the advertisement may include an active link to the advertiser's landing page which, if clicked by the viewer, will cause the client to be directed to the advertiser's landing page.

It has also been proposed to include banner advertisements in distributed media content such as HTML email messages. In one example, US Published Application 2005/0076051 to Carobus et al. describes a system for serving content targeted ads in email.

The Carobus et al. system provides an HTML snippet for inclusion in each email sent by the publisher. The HTML snippet includes a URL to which an impression request can be made and which is uniquely associated with the content that was previously made available to the Carobus et al. system.

When a client email system opens the email, an advertisement request is made to a URL identified in the HTML snippet. In response to the advertisement request, the Carobus et al. system: i) looks up previously registered content; ii) builds and returns an advertisement image including one or more relevant advertisements; and iii) assigns and returns a unique session ID. The session ID is returned as a cookie.

When a user "clicks" a rectangular region, the cookie, including the unique session ID, is returned to the server to allow the server to return a redirect URL to a landing page associated with the selected advertisement.

In an alternative system described in U.S. patent application Ser. No. 11/236,460, filed on Sep. 27, 2005 and commonly assigned with the present patent application, the email includes an image map of predetermined parameters, a template identifier identifying the image map and/or its predetermined parameters, a predetermined content request URL, and a unique instance identifier.

When a client email system opens the email, an advertisement request is made to the predetermined content request URL. The advertisement request includes the predetermined email identifier and the template identifier.

In response, the system looks up the parameters associated with the template identifier, builds and returns and advertisement image including one or more relevant advertisements sized to correspond to the image map, and stores an association between the unique ID provided in the request and redirect data associated with the advertiser.

When a user "clicks" on a region of the image map (e.g. one of the advertisements), a connection is made to redirect request URL embedded in the image map. The redirect request includes the unique ID (the same one as previously provided in the content request) to allow the server to return a redirect URL to a landing page associated with the selected advertisement.

A challenge with banner advertisements, whether hard coded or dynamically obtained and whether within published web media content or distributed media content, is that banner advertisements occupy only a small portion of a web page and are easily over looked. When a web page or email is opened on a client system, the user is generally focused on the media content, not the advertisements. Unless the banner advertisement captures the user's attention almost immediately, it will likely be scrolled outside of the viewing window before it is ever noticed. As such, banner advertisements have a degree of ineffectiveness in their aim to provide information about a product or service.

In a related field of invention, it is known to create a self-appearing advertising window which generally dominates the main part of the screen and covers at least a portion of the media content. Although these advertisements can be removed when the user clicks on the appropriate place(s), these advertisements have a much higher rate of being seen by users because media content is covered for either a preset amount of time and/or until the user clicks on the appropriate place(s) to make the advertisement disappear. These advertisements can be intrusive and may result in resentment among users who are accustomed to more passive online advertising methods.

In another separate field of invention, U.S. Pat. No. 5,995,102 to Rosen et al. discloses a system for modifying a mouse cursor image to attract viewer attention. In an embodiment disclosed in FIG. 8 of Rosen et al., the image of the mouse cursor is modified to the shape of a soda bottle to draw the user's attention to a banner advertisement for "Fizzy Cola". A limitation of the system of Rosen et al. is that the modified cursor still must be in a size and shape that facilitates is function cursor or pointer.

What is needed is a system and method for providing advertisements in conjunction with published or distributed media content as a web page or email, or inline search results, with an enhanced effectiveness in that such advertisements are not easily over looked. Further, what is needed is a system and method for providing such advertisements without the advertisements being intrusive and creating resentment. Further yet what is needed is a system and method for providing advertisements that attract viewer attention but are not limited by requirements that the advertisement also function as a cursor.

SUMMARY OF THE INVENTION

A first aspect of the present invention comprises a method for generating an advertisement impression which moves a selected instance of advertisement content in conjunction with a mouse pointer on a client rendering system. The method comprises defining, in a placement database, a plurality of instances of advertisement content. Each instance of advertisement content is associated with an advertisement category, a financial parameter, and response data.

The financial parameter defines an amount chargeable to the advertiser upon the occurrence of an assessment event associated with the instance of advertisement content.

The response data is at least one of: i) data useful for determining a redirect URL to which a client rendering system is to be directed upon user response to the instance of advertisement content; and ii) data useful for determining response content to be rendered on the client rendering system upon user response to the instance of advertisement content.

The method further comprises selecting, from the placement database, a selected instance of advertisement content. The selected instance of advertisement content is one of the plurality of instances of advertisement content that is associated with an advertisement category meeting selection criteria and a financial parameter meeting selection criteria.

The selected instance of advertisement content is combined with pointer tracking instructions to generate the advertisement impression. The pointer tracking instructions are operative on the client rendering system to: i) move the selected instance of advertisement content in response to detecting user movement of the mouse pointer; ii) receive an indication of user response to the selected instance of advertisement content; and iii) in accordance with the response data associated with the selected instance of advertisement content, perform at least one of: a) initiate a URL request to the redirect URL; and b) render the response content on the client rendering system.

In an exemplary embodiment, the response data may be response content in the form of a coupon and instructions to initiate printing of the coupon on the client rendering system. In this embodiment, the method may further comprise associating the advertisement impression with a unique impression identifier and embodying the unique impression identifier in the response content such that the coupon includes the unique impression identifier printed thereon when the coupon is printed. The unique impression identifier may be printed in barcode format.

In another exemplary embodiment, the method may further comprise associating the advertisement impression with initiation data. The initiation data is effective to delay the rendering of the selected instance of advertisement content on the client rendering system until the occurrence of an initiation event. The initiation event may be the occurrence of a predetermined time of day or user action such as typing a predetermined character string.

The pointer tracking instructions may further comprise instructions which effect closing of a window in which the selected instance of advertisement content is rendered at a predetermined time after the initiation event.

In another exemplary embodiment, the selected instance of advertisement content further comprises audio advertisement content. In this embodiment, the pointer tracking instructions are further effective to initiate output of the audio advertisement content by the client rendering system in conjunction with display of the instance of advertisement content.

A second aspect of the present invention is to provide an advertisement system for providing an instance of advertisement content which moves in conjunction with a mouse pointer on a client rendering system. The advertisement system comprises a placement database and a distribution object.

The placement database stores a plurality of instances of advertisement content, each in association with an advertisement category, a financial parameter, and response data.

The distribution object obtains from the placement database, a selected instance of advertisement content. The selected instance of advertisement content is one of the plurality of instances of advertisement content that is associated with an advertisement category meeting selection criteria and a financial parameter meeting selection criteria.

An advertisement delivery object combines the selected instance of advertisement content with pointer tracking instructions. Again, the pointer tracking instructions are operative on the client rendering system to: i) move the selected instance of advertisement content in response to detecting user movement of the mouse pointer; ii) receive an indication of user response to the selected instance of advertisement content; and iii) in accordance with the response data associated with the selected instance of advertisement content, perform at least one of: a) initiate a URL request to the redirect URL; and b) render the response content on the client rendering system.

Again, the response data may be response content in the form a coupon and instructions to initiate printing of the coupon on the client rendering system. In this embodiment, at least one of the distribution object and the advertisement delivery object may associate advertisement impression with a unique impression identifier and embody the unique impression identifier in the response content such that the coupon includes the unique impression identifier printed thereon when the coupon is printed. Again, the unique impression identifier may be printed in barcode format.

Again the advertisement impression may be combined with initiation data that is effective to delay the rendering of the selected instance of advertisement content on the client rendering system until the occurrence of an initiation event and, the pointer tracking instructions may further comprise instructions which effect closing of a window in which the selected instance of advertisement content is rendered at a predetermined time after the initiation event.

Again, the selected instance of advertisement content may further comprise audio advertisement content and the pointer tracking instructions may effect output of the audio advertisement content by the client rendering system in conjunction with display of the instance of advertisement content.

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 11 represents an exemplary advertisement request in accordance with one embodiment of the present invention;

FIG. 12 is a diagram representing an exemplary embodiment of an initiation event in accordance with one embodiment of the present invention;

FIG. 14 is a diagram representing an exemplary financial parameter in accordance with one embodiment of the present invention; and FIG. 15 is a diagram representing exemplary query parameters in accordance with one embodiment of the present invention.

DETAILED DESCRIPTION OF THE EXEMPLARY EMBODIMENTS

Figure 1:
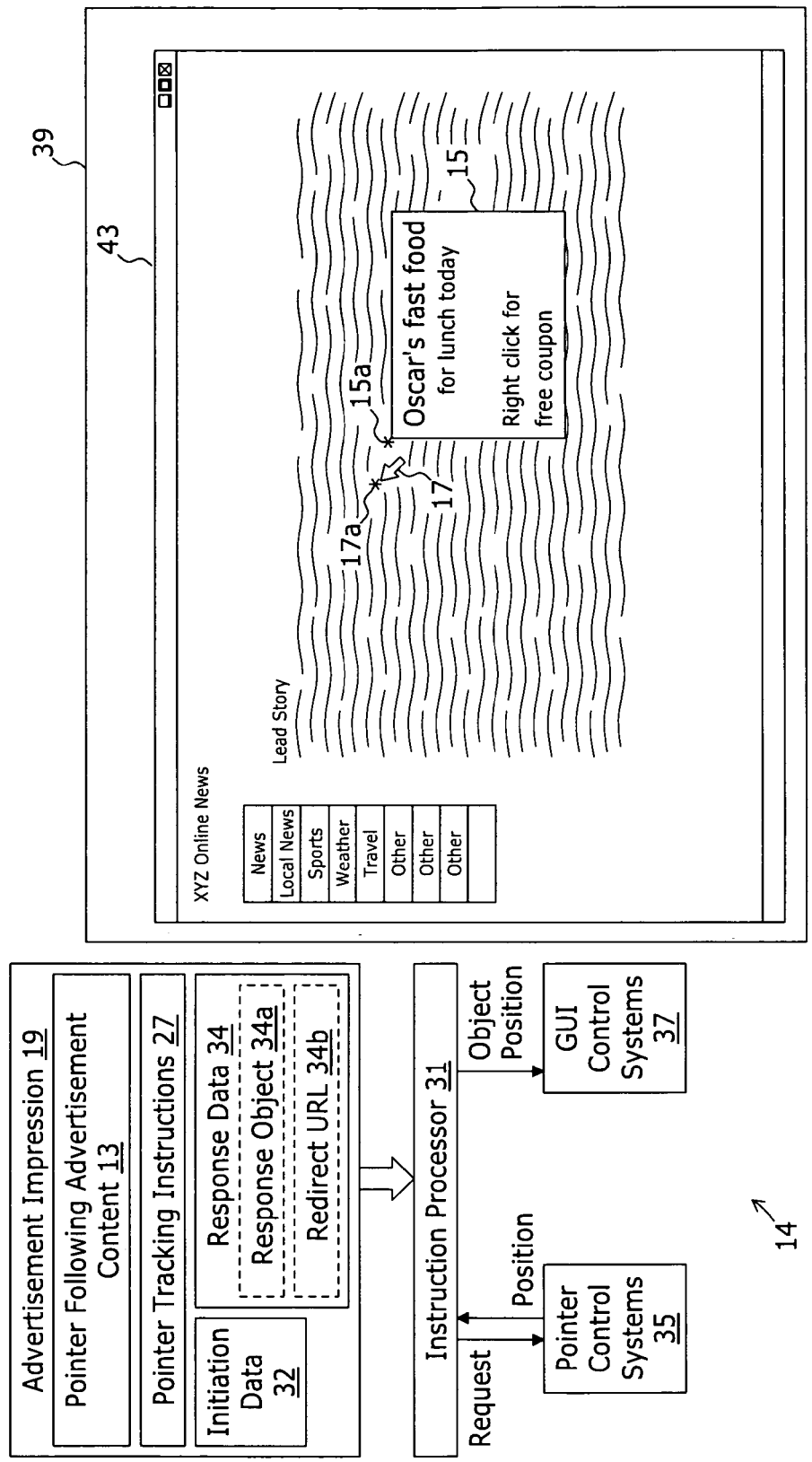
FIG. 1 is a block diagram representing delivery and rendering of advertisement content in accordance with an exemplary embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

The block diagram of FIG. 1 represents an exemplary embodiment of providing an advertisement impression 19 that includes a selected instance of advertisement content 13 for rendering within a window object 15 that moves in union with a mouse pointer 17 on a client rendering system 14.

The selected instance of advertisement content 13 is in any of a graphic, text, or motion video advertisement suitable for rendering within a window object 15 which moves within the graphical user interface (GUI) 39 of the client system 14 in conjunction with its mouse pointer 17. Further, any of the graphics, text, or motion video formatted advertisement content 13 may optionally include corresponding audio content for rendering by a speaker 41 (FIG. 7) associated with the client system 14.

To render the selected instance of advertisement content 13 within a window object 15 that moves within the GUI 39 in conjunction with the mouse pointer 17, the client rendering system 14 includes an instruction processor 31 and the advertisement impression 19 includes pointer tracking instructions 27. The pointer tracking instructions 27 are instructions which may be executed, or interpreted, by the instruction processor 31. For example, instructions 27 may be Java script which is interpreted by a Java interpreter plug in to a browser. As another example, the instructions 27 may be Active X code executed by an Active X processing module of an operating system of the client system 14.

The pointer tracking instructions 27, when operated by the instruction processor 31, provide for: i) launch of the window object 15 rendering the advertisement content 13; ii) movement of the window object 15 within the GUI 39 in conjunction with the mouse pointer 17; and iii) managing system response to consumer interaction with the window object 15.

Figure 2:
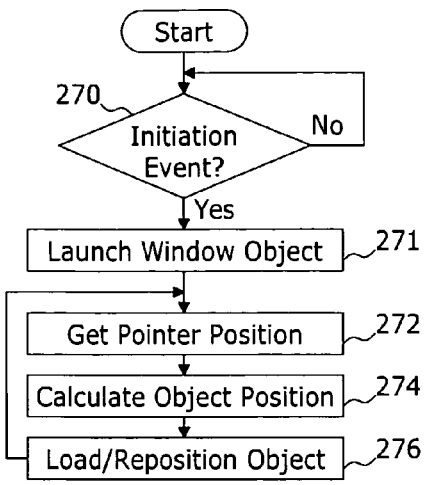
FIG. 2 is a flow chart representing exemplary operation of pointer tracking instruction code in accordance with one embodiment of the present invention.

Referring to the flow chart of FIG. 2 in conjunction with FIG. 1, when the advertisement impression 19 is delivered to the client system 14, the instruction processor 31 may begin interpreting or executing the pointer tracking instructions 27 to: i) determine whether an initiation event has occurred (at step 270); ii) upon the occurrence of the initiation event, launch the window object 15 (at step 271); and iii) commence movement of the window object 15 within the GUI 39 in conjunction with the mouse pointer 17 (See steps 272, 274, and 276 of FIG. 2).

In the exemplary embodiment, an initiation event is defined by initiation data 32 of the advertisement impression 19. In one embodiment, the initiation event may be the receipt of the advertisement impression 19 at the client rendering system 14 such that launch of the window object 15 may occur immediately when the advertisement impression 19 is received. In other embodiments, launch of the window object 15 may be delayed until the occurrence of an initiation event occurring subsequently to receipt of the advertisement impression 19. A more detailed discussion of delaying launch of the window object is included with the discussion of FIG. 12 below.

After the initiation event has occurred, as determined at step 270, the window object 15 is launched at step 271 and a repetitive sequence of steps to continually repositioning the window object 15 in conjunction with repositioning of the mouse pointer 17 is initiated.

The repetitive sequence of steps include: i) step 272 which comprises making a call to API's of pointer control systems 35 of the client system 14 and obtaining the position 17a of the mouse pointer 17 in response thereto; ii) step 274 which comprises calculating an object position 15a for the window object 15; and iii) step 276 which comprises making a call to API's of the graphical user interface (GUI) control systems 37 of the client 14 to reposition the window object 15 to the calculated object position 15a.

A shown in FIG. 1, calculating the object position 15a may comprise establishing the object position 15a (typically the upper left corner of the object window 15) at a particular horizontal offset and a particular vertical offset from the coordinates of the mouse pointer position 17a associated with the mouse pointer 17. The offset is to assure that the object window 15 is not overwritten directly onto the pointer 17. The preferable position for the window object is to the right and below the mouse pointer 17 when the mouse pointer is typically pointed to the upper right position of the GUI 39.

In one aspect of the present invention, it is desirable for the window object 15 to remain within the confines of the browser window or other large window object 43 even if the mouse pointer 17 is moved to areas of the GUI 39 outside of the browser window 43. In such an embodiment, the step of calculating the object position 15a may comprise establishing the object position 15a at a particular horizontal offset and a particular vertical offset from a pointer position 17a associated with the mouse pointer 17—but only within certain predetermined coordinates within the GUI 39 which correspond to the object 15 remaining within the boundaries of the browser window or other large window object 43.

Figure 3:
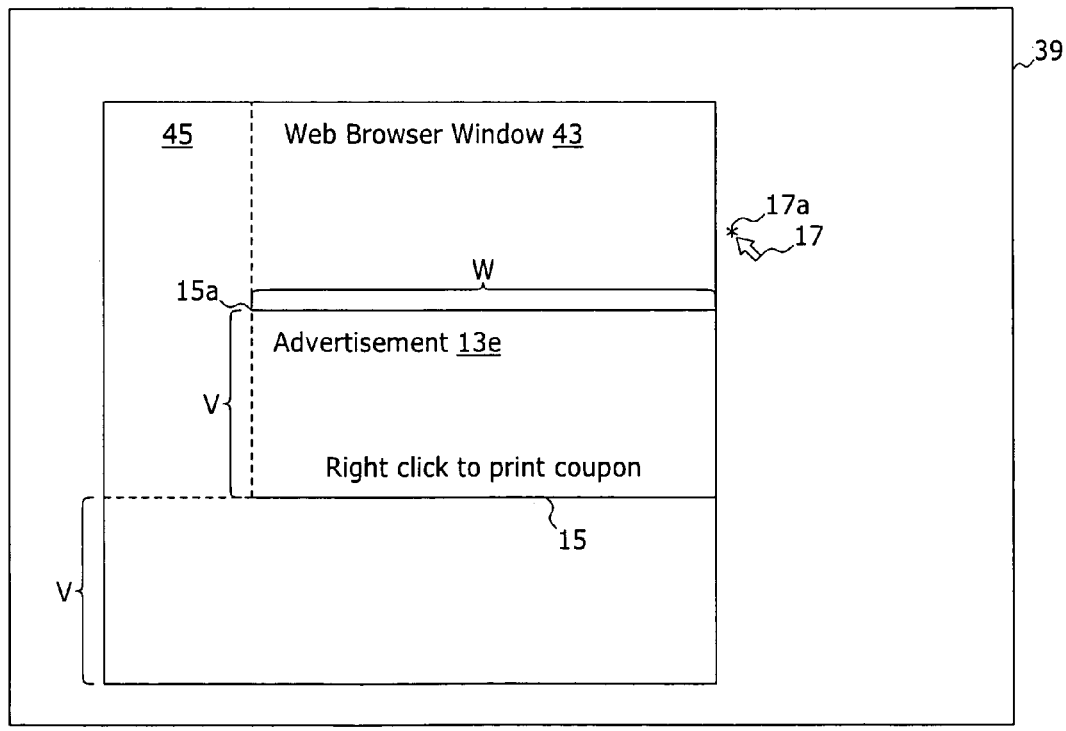
FIG. 3 is a diagram representing an exemplary embodiment of calculating a window object position in accordance with one embodiment of the present invention.

As shown in FIG. 3, the predetermined coordinates within the GUI 39 are those coordinates within the hashed box 45 which has: i) an upper boundary coinciding with the upper boundary of the browser window 43; ii) a lower boundary offset from the lower boundary of the browser window 43 by a vertical offset "V" equal to the vertical height of the window object 15; iii) a left boundary coinciding with the left boundary of the browser window 43; and iv) a right boundary offset from the right boundary of the browser window 43 by a horizontal offset "W" equal to the width of the window object 15.

Returning to FIG. 1, response data 34 (included in the advertisement impression 19) defines how the rendering system 14 responds to consumer interaction with the window object 15.

In the exemplary embodiment, the response data 34 may include at least one of a redirect URL 34b to which a client rendering system 14 is to be directed upon consumer response to the instance of advertisement content 13; and ii) a response object or data useful for determining response content to be rendered on the client rendering system 14 (collectively a response object 34a) upon consumer response to the instance of advertisement content 13.

Figure 4:
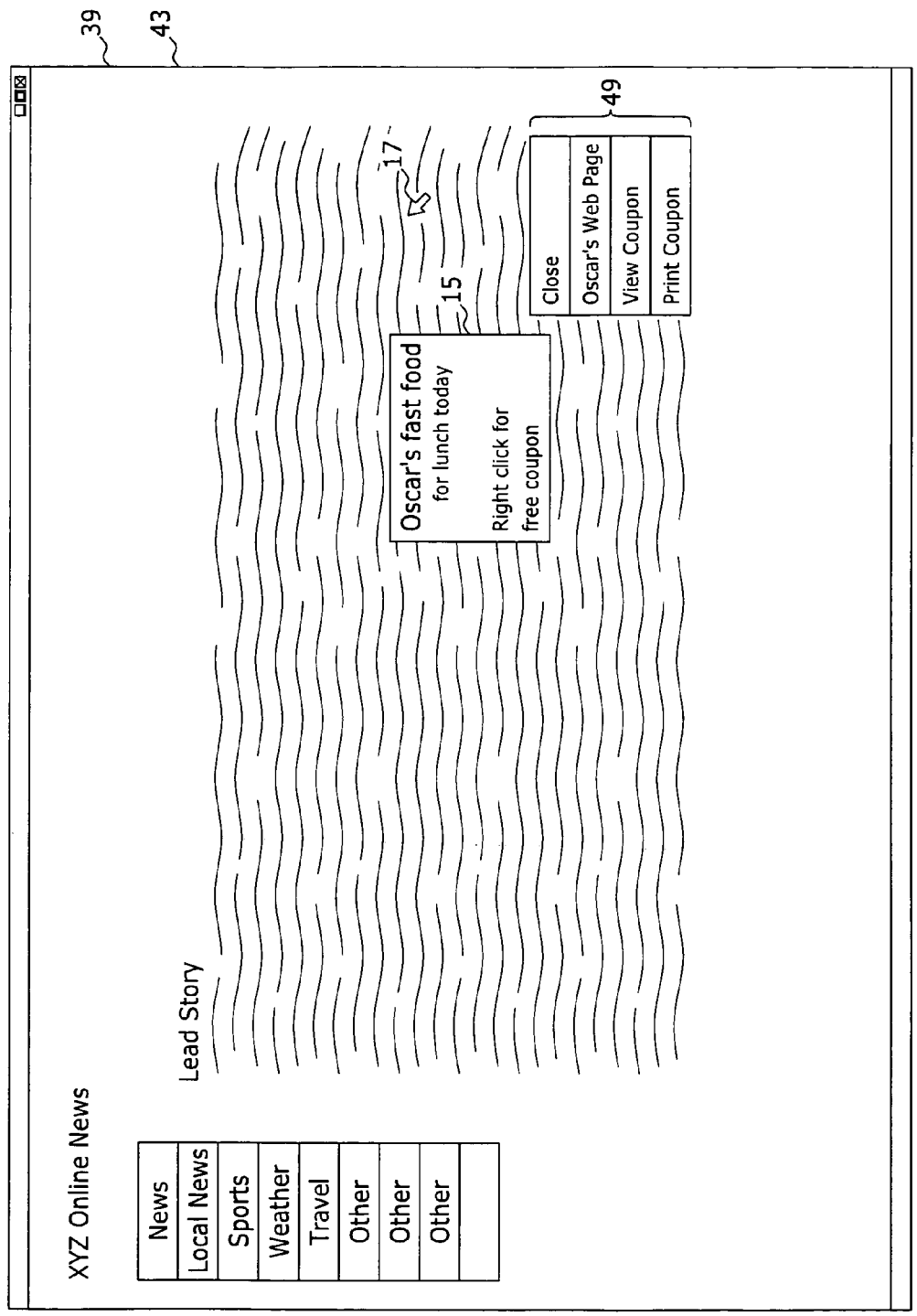
FIG. 4 is a diagram representing an exemplary user interface in accordance with an exemplary embodiment of the present invention.

An exemplary response in accordance with response data 34 may include opening a right-click-menu 49, as represented by FIG. 4, in response to a consumer right mouse click of the object 15. The right-click-menu 49 may include several menu choices including choices for: i) closing the window object 15; ii) opening a browser window and establishing a connection to a redirect URL that links to the advertiser's web page; iii) viewing a coupon of value in a potential consumer transaction; and iv) printing such coupon. As shown in FIG. 4, after opening a right-click-menu 49, at least the menu 49 is decoupled from consumer movement of the mouse pointer 17 to enable use of the pointer for making menu choices.

Other exemplary responses in accordance with the response data 34 may include: i) closing the window object 15 in response to a consumer selection of a "close" menu choice from the right-click-menu 49; ii) launching a browser window and establishing a connection to a redirect URL 34b in response to a consumer left mouse click on the advertisement content 13 or in response to a consumer selecting an "Advertiser's web page" menu choice from the right-click menu 49; and iii) displaying and/or printing a coupon in response to a consumer selecting a "display" and/or "print coupon" menu choice from the right-click-menu 49.

Figure 5:
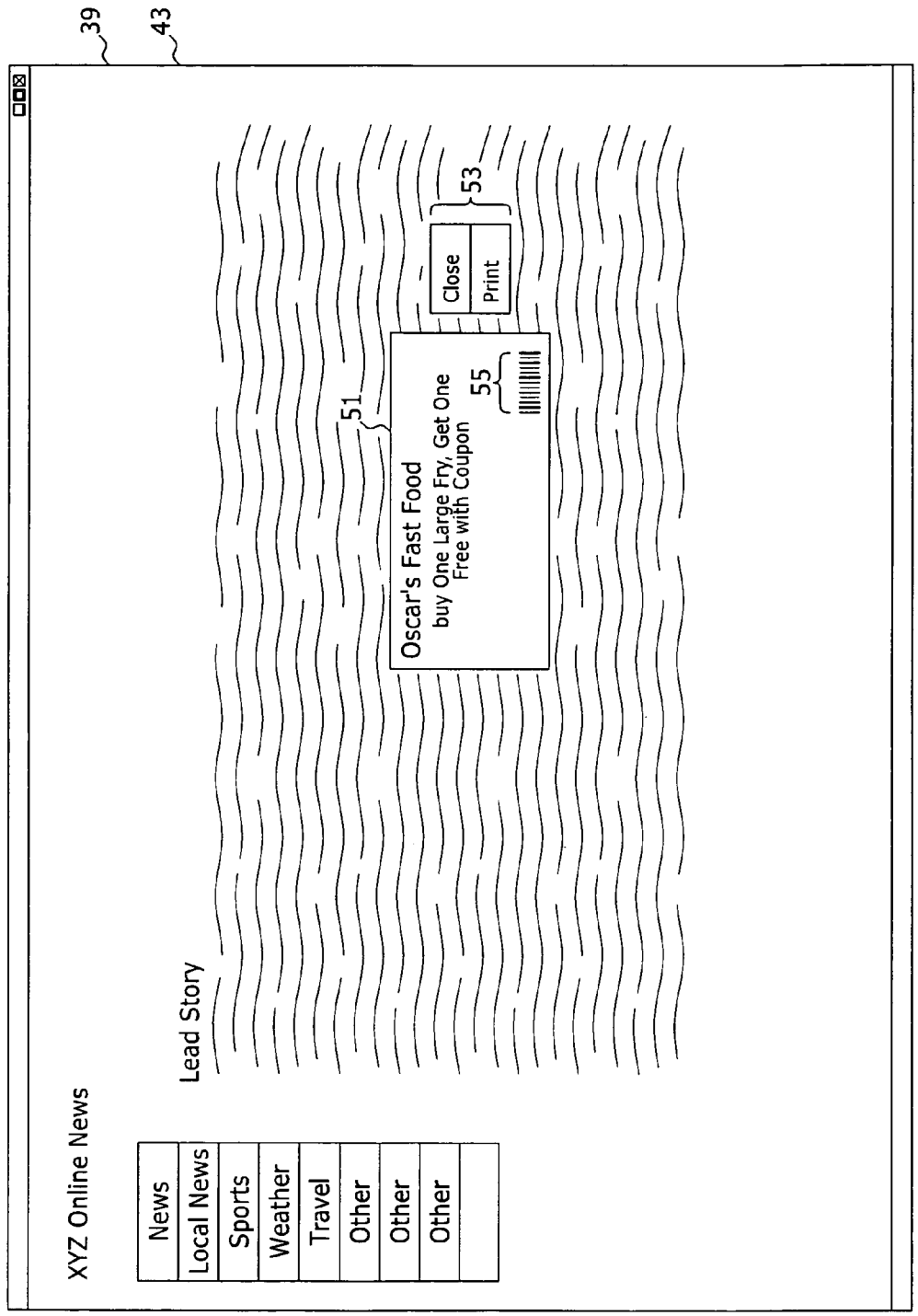
FIG. 5 is a diagram representing an exemplary user interface in accordance with an exemplary embodiment of the present invention.

In an exemplary embodiment wherein the response data 34 defines display and/or printing of a coupon in response to consumer selection of "coupon" from the right-click-menu 49, the display of the coupon 51 may be associated with another menu 53 which enables consumer selection to send the coupon to a print spooler for printing as shown in FIG. 5.

The systems of the present invention enable the coupon to include a unique serial number or campaign number 55 (embodied in a barcode) which may prevent duplicate printing and/or use of the coupon. The unique serial number or campaign number 55 may be included as a component of the response data 34. Use of the serial number 55 to distinguish multiple coupons which may be printed by multiple consumers using different client rendering systems is useful for tracking consumer behavior and/or identifying a conversion event (e.g. consumer use of the coupon in a transaction).

Figure 6:
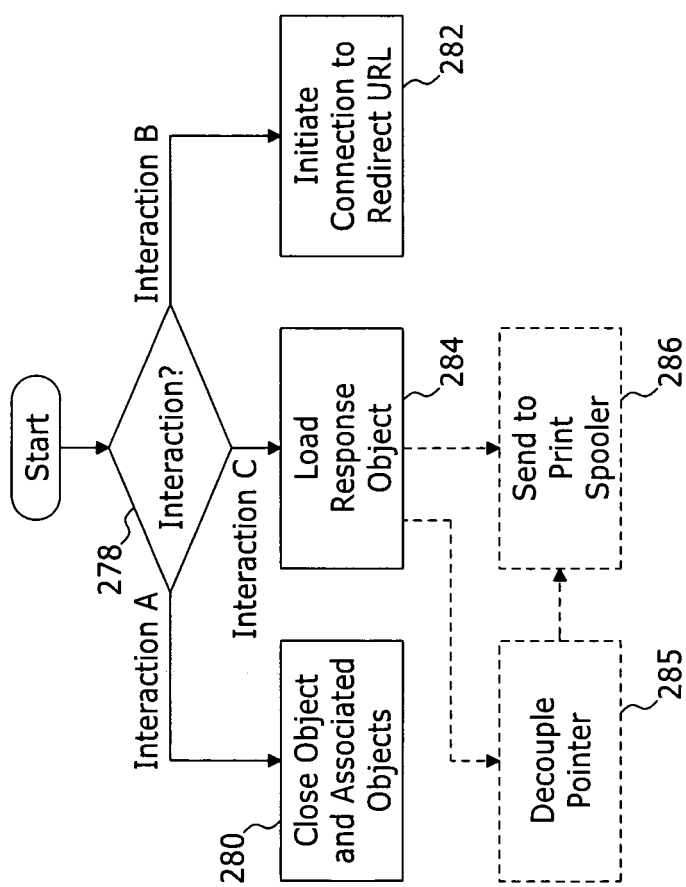
FIG. 6 is a flow chart representing exemplary operation of pointer tracking instruction code in accordance with one embodiment of the present invention.

The flow chart of FIG. 6 represents exemplary operation of an aspect of the pointer tracking instructions 27 in combination with response data 34 controlling the consumer's interaction with the window object 15. Referring to FIG. 6 in conjunction with FIG. 1, one exemplary interaction may be the user actuating a GUI control to close the advertisement impression (Interaction A of FIG. 6). In response to detecting Interaction A, the instructions 27 provide for closing of the window object 15 and, if applicable, terminating output of corresponding audio content as represented by step 280.

Another exemplary interaction may be user actuating a GUI control to connect to the advertiser's web page (Interaction B of FIG. 6). In response to detecting Interaction B, the instructions 27 provide for opening a browser window and initiating a connection to a redirect URL 34a (defined in the response data 34) which links the client system 14 to the advertiser's web page as represented by step 282.

Another exemplary interaction may be user actuating a GUI control to load an embedded response object 34b (defined within the response data 34) for either display, display and printing, or display and automatic printing (Interaction C of FIG. 6). In response to detecting Interaction C, the instructions 27 provide for loading the response object 34b as represented by 284.

An example of a response object may be a right click menu 49 (FIG. 4) and an example of Interaction C may be the consumer performing a "right mouse click" on the advertisement to open the right click menu 49. In response to such Interaction C, the right click menu 49 would be loaded at step 284 and such object decoupled from consumer movement of the mouse pointer 17 (e.g. the mouse pointer 17 moves independently of the right click menu 49) to enable use of the pointer for making menu choices at step 285. In response to user selection of a menu choice to print a coupon 51 (FIG. 5) the coupon 51 would be loaded and sent to the print spooler for printing as represented by step 286. The instructions 27 may provide for closing the response object and/or the window object after printing.

Another example of a response object may be the coupon 51 (FIG. 5) without use of a right click menu and an example of Interaction C may be the consumer performing a "right mouse click" on the advertisement to print the coupon 51. In response to such Interaction C, the coupon 51 would be loaded and sent to the print spooler for printing. The instructions 27 may provide for closing the response object and/or the window object after printing.

Figure 7:
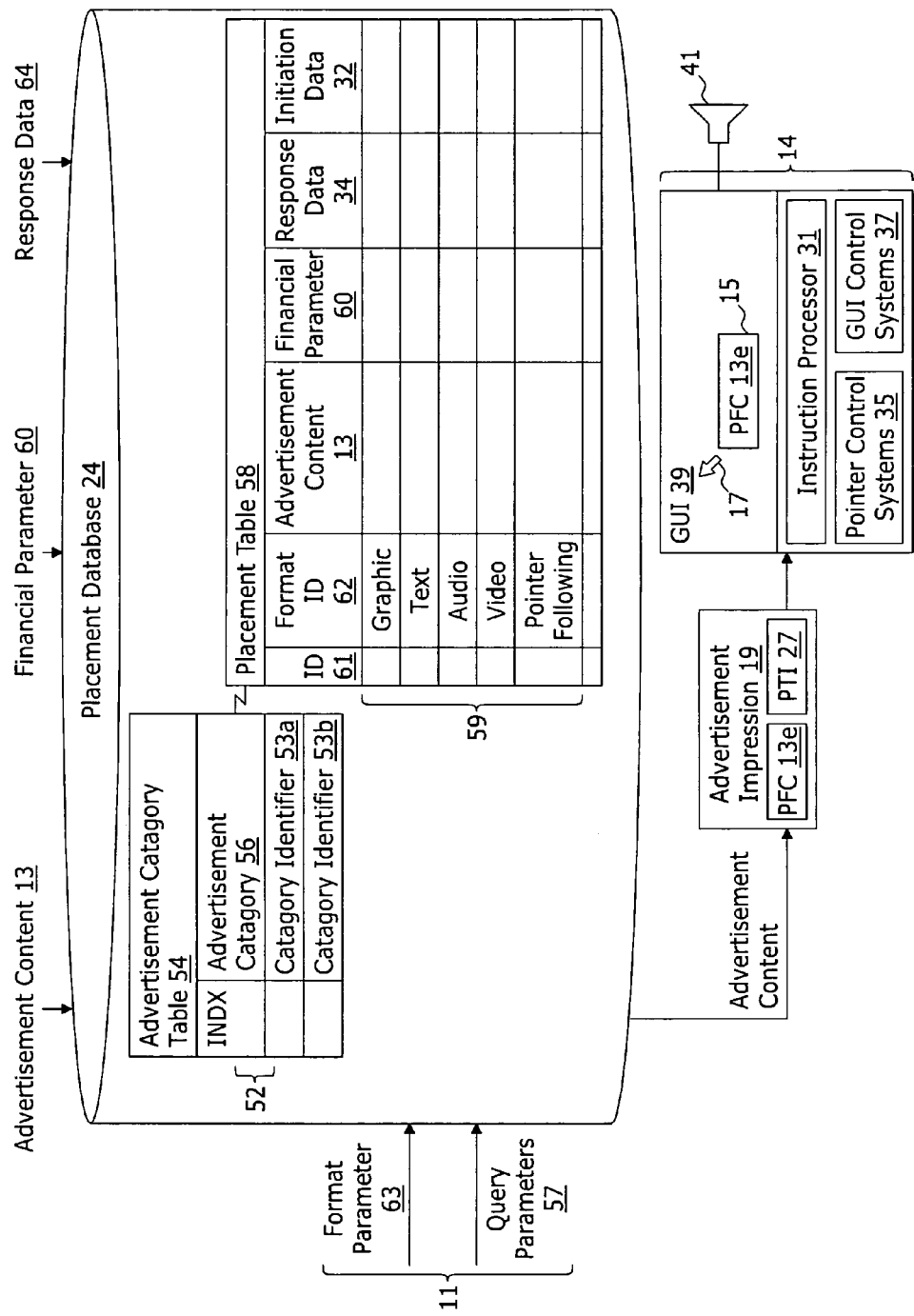
FIG. 7 is a block diagram representing a system for providing advertising content in accordance with an exemplary embodiment of the present invention.

Referring to FIG. 7, a placement database 24 drives the selection of advertisement content 13 for delivery to a client system 14. In the exemplary embodiment, the table structure of the placement database 24 is configured to associate instances of advertisement content 13 with advertisement categories 56.

In an exemplary table structure, an advertisement category table 54 defines a plurality of advertisement categories 56, each identified by a category identifier 53 stored in a record 52 of the advertisement category table 54. Each advertisement category 56 may define a category of potential need or market for a type of goods or services.

Associated with advertisement category 56 is a placement table 58. Stored in each record 59 of the placement table 58 is an instance of advertisement content 13 that is relevant with the advertisement category. More specifically, each instance of advertisement content 13 defined in the placement database 24 is stored in those placement table(s) 58 that associate with advertisement categories 56 to which the goods or services provided by the advertiser and/or advertised by the instance of advertisement content 13 are relevant.

Although the advertisement categories 56 are distinguished in a "single level" in the example of FIG. 7, such illustration is for simplicity of discussion only. It is envisioned that advertisement categories 56 may be defined by multiple layers of nested subcategories. For example, geographically based subcategories within a general category is a useful organization for creating advertisement categories 56 related to a market or potential need for fast food restaurants because the market and potential need for restaurants is geographically based. A fast food restaurant located in one state is not relevant to a consumer with a need for a fast food restaurant in a different state.

In the exemplary embodiment, each advertisement category identifier 53 is a character sting representing a word or words that linguistically describe the advertisement category 56. However, it is envisioned that the advertisement category identifier 53 may be numerical, a coded alpha-numeric character string, or any other parameter selected to identify a market and/or a potential need for a type of goods or services and/or distinguish a market and/or a potential need for a type of goods or services from others.

Each placement table 58 may include instances of advertisement content 13 that are in differing rendering formats. Therefore, each record 59 may include a rendering format identifier 62 which identifies the rendering format of the instance of advertisement content 13 stored in such record 59. Exemplary formats include a graphic rendering format, a text rendering format, an audio rendering, a motion video rendering format, and a mouse pointer following rendering format. For purposes of the present invention, the placement table 58 includes at least one instance of advertisement content 13 suitable for a pointer following rendering. As discussed, the pointer following rendering may be a combination of any of the graphic rendering, text rendering, or motion video rendering—each with or without a corresponding audio rendering.

In general, a web server (not shown) provides a user interface to obtain, and define in the placement database 24, each of a plurality of instances of advertisement content 13, an advertisement category 56 with which to associate the instance of advertisement content 13, a financial parameter 60 to associate with the advertisement content 13 (which may be specific to the advertisement category 56 if the same advertisement content 13 is associated with a plurality of advertisement categories 56), initiation data 32 to associate with the instance of advertisement content 13, and the response data 34 to associate with the instance of advertisement content 13.

Figure 8:
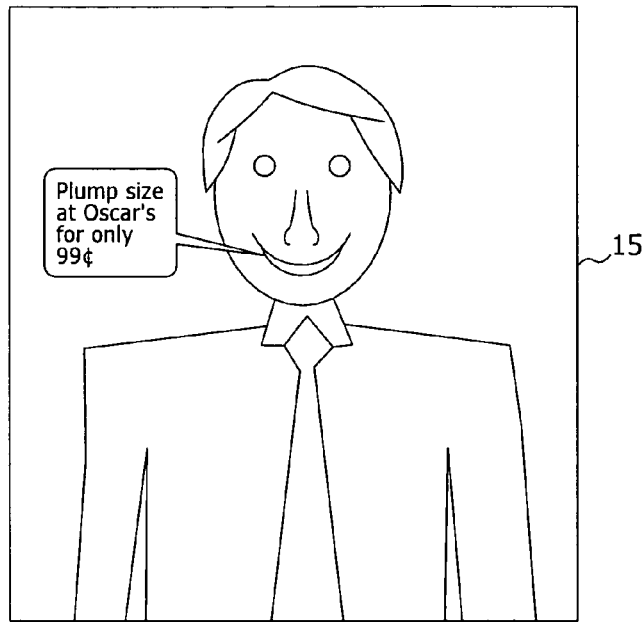
FIG. 8 is a diagram representing an exemplary embodiment of providing advertisement content in the format of motion video animation in accordance with one embodiment of the present invention.

However, it is also envisioned that certain rendering formats may be automatically created from content provide by an advertiser in other rendering formats. For example, turning briefly to FIG. 8, a motion video rendering of an instance of advertisement content 13 may include an auto rendered animated character speaking text advertisement content or singing a musical audio rendering of advertisement content (such as an advertiser's jingle).

To implement auto rendering, a text-to-motion-video object or audio-to-motion-video object (described in more detail in U.S. patent application Ser. No. 11/284,571, filed on Nov. 22, 2005, commonly assigned herewith, and incorporated herein by reference) may be called to generate the motion video of the animated character.

Auto rendering may include selecting a specific one of a plurality of characters and, in the example of text to motion video, selecting the character's corresponding voice. The selection of a character (and voice if appropriate) may be based on any of advertisement content and/or past performance results using the selected character, voice, and/or other parameters.

As described in U.S. patent application Ser. No. 11/284, 571, if all words that are to be auto-rendered are known good words (e.g. a defined motion for the character's lips exists in a known good words database and in the case of text to speech, a defined pronunciation exists in the known good words database), the auto rendering object generates the motion video of the animated character performing the advertisement.

If human review is necessary, based on review rules designed for calling attention to motion video files that may not be appropriately rendered, the auto rendering may be queued for human review. After review, or upon rendering if review is not needed, the auto rendered advertisement content is made available in the placement database 24.

Returning to FIG. 7, selection of a particular instance of advertisement content 13 to render (e.g. the selected instance of advertisement content) is based on selecting an instance of advertisement content 13 that is: i) associated with an advertisement category 56 meeting advertisement category selection criteria; ii) associated with a financial parameter 60 meeting financial selection criteria; and iii) in a rendering format that can be rendered on the client rendering system 14.

In general, the selected instance of advertisement content 13 is provided in response to an advertisement request 11 which includes a format parameter 63 and query parameters 57.

The format parameter 63 is useful for identifying those instances of advertisement content 13 that are in a format that can be rendered on the client rendering system 14 (e.g. those instances stored in a record 59 of the placement table 58 with a format identifier 62 that correspond to the format parameter 63)

The query parameters 57 are parameters useful for identifying those advertisement categories 56 to which the consumer is likely to respond (e.g. the advertisement category selection criteria). Referring briefly to FIG. 15, exemplary query parameters 56 include, but are not limited to parameters such as: a search parameter 57a; geography/location parameters 57b; a date/time parameters 57c, consumer demographic parameters 57d; and consumer behavior and/or historical activities parameters 57e.

Figure 9:
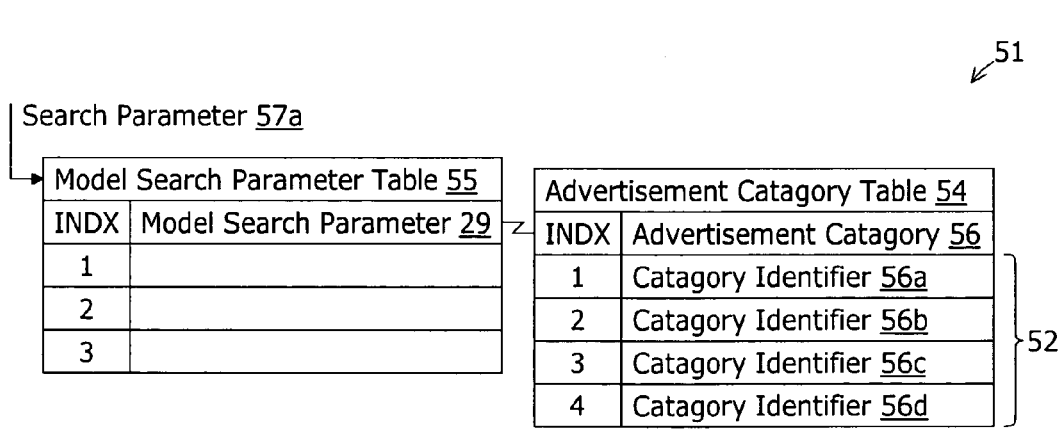
FIG. 9 is a diagram representing exemplary table structure of associating a search parameter with an advertisement category in accordance with one embodiment of the present invention.

FIG. 9 represents exemplary table structure for an example of using the search parameter query 57a for identifying advertisement categories 56 meeting the advertisement category selection criteria. Referring to FIG. 9 in conjunction with FIG. 7, the search parameter 57a may be a word, phrase, or other parameter that associates with a market and/or a potential need of the consumer to which the instance advertisement content 13 will be delivered for rendering. Examples may include: i) a word, phrase, or other parameter that associates with media which with the advertisement content will be delivered to the client system 14; ii) a search string entered by the consumer into a "search box" interface; or iii) a word, phrase, or other parameter that otherwise associates with a market and/or potential need of the consumer using the client system 14 to which the advertisement content 13 will be delivered for rendering.

A model search parameter table 55 stores each of a plurality model search parameters 29. Associated with each model search parameter 29 is an advertisement category table 54 storing a category identifier 53 for each of a plurality of advertisement categories 56 that associate with the model search parameter 29.

When a search parameter 57*a* is received as part of an advertisement request 11, it is mapped to an equivalent or semantically similar model search parameter 29. The advertisement categories 56 listed in the advertisement category table 54 associated with such semantically similar model search parameter 29 define those advertisement categories 56 that meet the advertisement category selection criteria. And, those instances of advertisement content 13 stored in a placement table 58 that is associated with an advertisement category 56 meeting the advertisement category selection criteria meet the advertisement category selection criteria.

Returning to FIG. 7, as discussed, the selected instance of advertisement content 13 not only needs to meet the advertisement category selection criteria but must also be associated with a financial parameter 60 meeting financial parameter selection criteria. The financial parameter 60 stored in association with each instance of advertisement content 13 provides a basis for determining a charge assessable to the advertiser upon the occurrence of an assessment event related to the instance of advertisement content 13.

Turning briefly of FIG. 14, the financial parameter 60 may comprise such parameters as an assessment basis 60*a*, a base charge 60*b*, and other financial factors 60*c* for providing a basis for determining a charge assessable to the advertiser upon the occurrence of an assessment event related to the instance of advertisement content.

The assessment basis defines the event triggering assessment of the charge to the advertiser. Exemplary assessment events include: i) rendering of the instance of advertisement content; ii) consumer response to the advertisement content (for example clicking on an advertisement impression and linking to the advertiser's web page); iii) the consumer entering into a transaction to purchase goods or services from the advertiser (such as by using the coupon) and such transaction is linked to consumer response to the advertisement (e.g. commonly called conversion); and iv) other assessment events related to the rendering of the instance of the advertisement content or the consumer taking action in response thereto.

The base charge 60*b* may be either a fixed base charge 302, a variable base charge 304, or information useful for looking up, calculating, or otherwise determining a fixed base charge 302, a variable base charge 304, or other base compensation scheme.

Examples of a fixed base charge 302 include: i) a bid amount associated with an instance of advertisement content—which may be different for different format renderings (or multiple format renderings) of what would otherwise be the same advertisement; and ii) other functions in which the charge assessable to the advertiser is the same each time the assessment event occurs with respect to the same instance of advertisement content.

Examples of a variable charge 304 may include charges which are a function of: i) a charge which increases or decreases as a function of the number of times the instance of advertisement content is rendered, ii) which are based a function of conversion revenue (revenue on a commercial transaction that is a result of consumer response to the instance of advertisement content); or iii) other functions in which the charge assessable to the advertiser may be different each time the assessment event occurs with respect to the same instance of advertisement content.

Exemplary other factors 60*c* are functions useful for altering the assessment charge based on factors relevant to the advertisement. Examples include: i) functions for discounting or providing a premium based on delivery of the instance of advertisement content through a particular advertisement delivery system 12 (FIG. 10); ii) functions for discounting or providing a premium based on delivery of the instance of advertisement content for rendering based on customer demographics and/or behavior patterns; and iii) functions for discounting or providing a premium based other advertisement related factors.

The financial selection criteria may specify selecting the instance of advertisement content 13 having a favorable financial parameter 60, for example the highest assessable amount (or estimated or predicted highest assessable amount) based the assessment basis 60*a*, base charge 60*b*, and/or other factors 60*c*.

In another example, the financial selection criteria may specify selecting, on a rotating basis, one of a plurality of instances of advertisement content 13. U.S. patent application Ser. No. 10/724,546 filed on Aug. 19, 2004 and commonly assigned with the present application describes systems and methods for selecting one of a plurality of instances of advertisement content. The contents of such application is incorporated herein.

Figure 10:
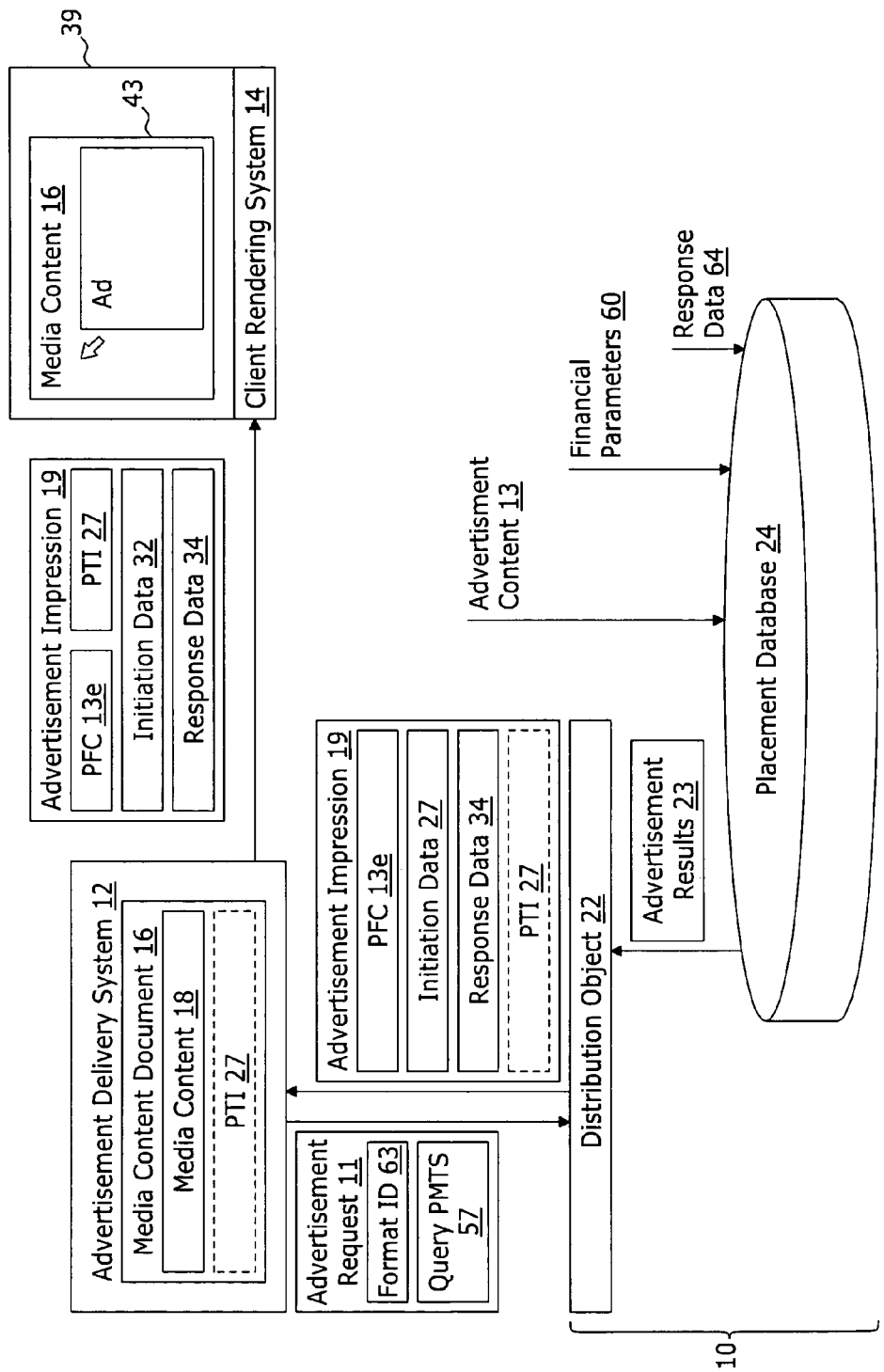
FIG. 10 is a block diagram representing a system for providing advertising content in accordance with an exemplary embodiment of the present invention.

FIG. 10 represents an exemplary embodiment of the present invention wherein the advertisement impression 19 is delivered to the client system 14 by a remote advertisement delivery system 12.

Exemplary advertisement delivery systems 12 may include: i) a web server which delivers the advertisement impression 19 to the client rendering system 14 in conjunction with delivery of web page media content; ii) an advertisement delivery system embedded within an email message wherein such embedded object retrieves the advertisement impression 19 to the client rendering system 14 upon opening of the email message by the client rendering system 14; and iii) an executable advertisement delivery system (such as a tool bar) operating on the client rendering system 14 which retrieves the advertisement impression 19 to the client rendering system 14 in accordance with an advertisement rendering formula.

The advertisement delivery system 12 (whether operating distinct from the client rendering system 14 or operating as a component of the client rendering system 14) generates the advertisement request 11 to a distribution object 22 that associates with the placement database 24. The distribution object 22 returns the selected instance of advertisement content 13 based on the format identifier 63 and the query parameters 57 of the advertisement request 11 as previously discussed.

In one exemplary embodiment, the advertisement delivery system 12 stores the pointer tracking instructions 27. In an alternative embodiment, the pointer tracking instructions 27 may be provided by the distribution object 22 as part of the response. In either embodiment, the selected instance of advertisement content 13 is combined with pointer following instructions 27 (and, if applicable, the initiation data 32 and response data 34) to form the advertisement impression 19. Further, if the response data 34 includes a response object 34*b* (FIG. 1) that includes a coupon 51 (FIG. 5), the distribution object 22 may generate the unique identifier or campaign identifier 55 for distinguishing the coupon 51 from other similar coupons or coupon campaigns.

In the exemplary embodiment, the distribution object 22 may form a web server front end which receives each advertisement request 11 over the Internet. The advertisement request 11 may be: i) in the form of an HTTP connection to a specified URL which includes an extension identifying format parameter 63 and the query parameters 57; ii) in the form of Simple Object Access Protocol messaging which includes the format identifier 63 and the query parameters 57; or iii) in the form of any other messaging protocol wherein the format identifier 63 and the query parameters 57 may be sent to the distribution object 22 and a response received from the distribution object 22.

Referring to FIG. 11, an advertisement request 11 in the form of an exemplary advertisement request URL 71 is represented. The advertisement request URL 71 comprises a predetermined core URL 78, a predetermined URL extension 80, a format parameter 63 in the form of a FormatID value 82, and query parameters 57 in the form of one or more identified query parameter value(s) 86.

The predetermined core URL 78 is a URL recognizable by DNS servers to facilitate routing of an HTTP connection request using the advertisement request URL 71 to a server operating the distribution object 22. An example of a core URL 78 would be "imagelisting.miva.com".

Delayed Initiation of Rendering

Returning to FIG. 1, as discussed, the initiation data 32 may define an initiation event which triggers launch of the window object 15 which renders the instance of advertisement content 13. If the initiation event is the occurrence of a predetermined time, the passage of time, the closing of a web page, or a similar event, determining the occurrence of the initiation event may comprise making processing calls to other systems of the client system 14 to monitor for its occurrence.

The diagram of FIG. 12 represents an exemplary embodiment wherein the initiation event is the occurrence of a predetermined target time 290. Referring to FIG. 12 in conjunction with FIG. 1, in this embodiment, the instructions 27 in accordance with initiation data 32 provide for polling an internal clock of the client system 14 and only initiating the rendering of the instance of advertisement content 13 at the predetermined target time 290 defined in the initiation data 32. Stated another way, the instructions 27 may provide for the window object 15 to remain hidden from display on the GUI 39 between the time that the advertisement impression 19 is delivered to the client system 14 (e.g. the load time 289) and the occurrence of the predetermined target time 290 (represented by 296).

At the target time 290, the window object 15 is displayed on the GUI 39 (represented by 298). The window object 15 remains displayed (and tracking the pointer 17) until: i) it is closed by the consumer; ii) a predetermined elapse time 292 passes; or iii) until a predetermined end time 294 is reached. At which time the window object 15 is closed (represented by 300).

Multiple Rendering Formats

Figure 13:
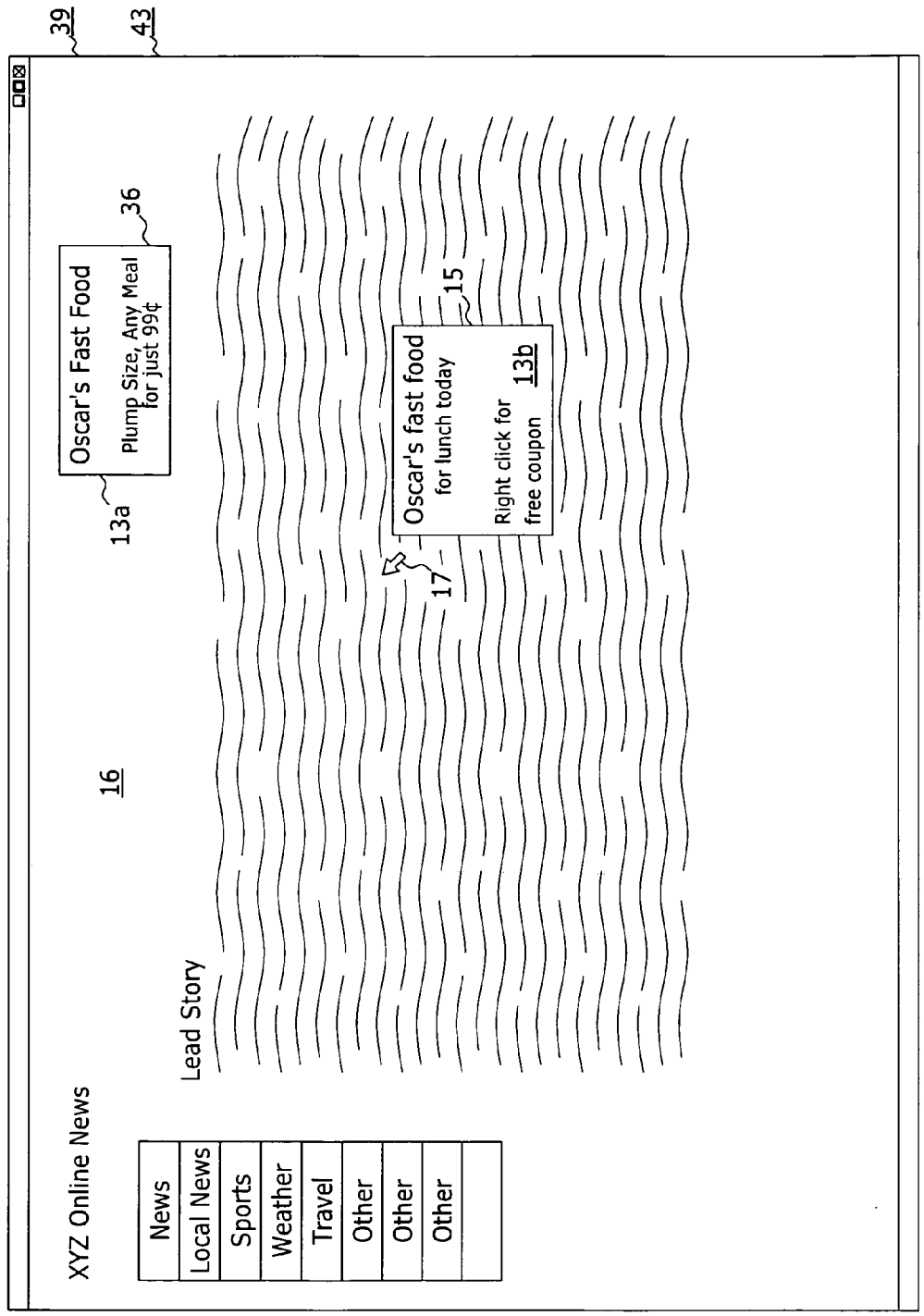
FIG. 13 is a diagram representing an exemplary user interface in accordance with an alternative embodiment of the present invention.

Turning briefly to FIG. 13, it is envisioned that an advertisement impression 19 may include multiple selected instances advertisement content 13 for simultaneous rendering. In the example of FIG. 13, both: i) an instance of text advertisement content 13a is rendered within a traditional banner advertisement frame 36; and ii) an instance of pointer following content 13b is rendered within a window object 15 that moves in conjunction with the mouse pointer 17. The systems described enable such multiple rendering by the inclusion of applicable format identifiers 63 within the advertisement request 11 (FIG. 7).

In summary, it should be appreciated that the present invention provides for delivering advertising content for display within a window object that moves in union with a mouse pointer or cursor on a client rendering system.

It should be appreciated that such a rendering provides advantages over banner advertising in that when the consumer's attention is focused on the mouse pointer, the advertisement content is directly within the consumer's field of view thereby increasing the probability that the consumer notices the advertisement.

It should also be appreciated that display of advertisement content within a window object which moves in association with the mouse pointer of the rendering client provides advantages over traditional static pop-up window advertising in that the window object is easily moved by the consumer simply moving the mouse such that it is not annoyingly interfering with the consumer viewing of other content within the GUI.

Although the invention has been shown and described with respect to certain exemplary embodiments, it is obvious that equivalents and modifications will occur to others skilled in the art upon the reading and understanding of the specification.

For example, the placement database (and other databases discussed within the specification) may comprise related tables of data and the depictions thereof are for purposes of facilitating discussion of exemplary structure for the storage of data useful for implementing an embodiment of the present invention and are not intended limit the scope of the present invention. An individual skilled in the art of database design may, with an understand that the present invention, readily select alternative data storage relationships for performing in accordance with the present invention.

As yet another example, although each of the placement database, distribution object, and advertisement delivery system, and client rendering system are shown as discreet objects in FIG. 10, those skilled in the art will appreciate that the functions of each such object are readily implemented: i) on a single hardware system ii) on multiple interconnected hardware systems with elements of each implemented on one or more distinct hardware systems; or iii) on multiple interconnected hardware systems with functions of each of elements distributed across each of the multiple hardware systems.

The present invention includes all such described equivalents and modifications, and is limited only by the scope of the following claims.

What is claimed is:

1. A computer-implemented method comprising:
receiving, by a client computing device, a generated advertisement impression, wherein the generated advertisement impression comprises a selected instance of advertisement content and pointer tracking instructions;
generating, by the client computing device, according to the pointer tracking instructions, the advertisement impression, wherein the advertisement impression is positioned at a first location in the window that is independent of a current location of a mouse pointer;
detecting, by the client computing device, a user movement of the mouse pointer;
repositioning, by the client computing device, the advertisement impression at a second location in response to detecting the user movement of the mouse pointer, wherein the advertisement content includes a selectable item; and
decoupling the mouse pointer from movement of the mouse pointer to enable selection of the selectable item.

2. The method of claim 1, wherein:
an instance of advertisement content is associated with an advertisement category identifier;
the selected instance of advertisement content is one of a plurality of instances of advertisement content that is both associated with an advertisement category identifier meeting selection criteria and a financial parameter meeting selection criteria.

3. The method of claim 2, wherein the instance of advertisement content is associated with response data, wherein the response data is response content in the form of a coupon and instructions to initiate printing of the coupon.

4. The method of claim 3 wherein:
the advertisement impression is associated with a unique impression identifier;
the response content in the form of a coupon includes the unique impression identifier thereon when the coupon is printed; and
the selected instance of advertisement content is associated with an assessment event, the assessment event comprises use of the coupon in a transaction, then coupon being identified by its unique impression identifier.

5. The method of claim 1, wherein:
the instance of advertisement content is associated with response data, wherein the response data includes response content in the form of a right click menu; and
the pointer tracking instructions, in accordance with the response data:
render the right click menu; and
decouple the mouse pointer from movement of the mouse pointer to enable selection of a menu choice from the right click menu.

6. The method of claim 5, wherein the response content further includes a coupon and instructions to initiate printing of the coupon in response to selection of a print coupon choice from the right click menu.

7. The method of claim 6 wherein:
the advertisement impression is associated with a unique impression identifier;
the response content in the form of a coupon includes the unique impression identifier thereon when the coupon is printed; and
the selected instance of advertisement content is associated with an assessment event, the assessment event comprises use of the coupon in a transaction, the coupon being identified by its unique impression identifier.

8. The method of claim 1, wherein the advertisement impression is associated with initiation data, the initiation data effective to delay the rendering of the selected instance of advertisement content until the occurrence of an initiation event.

9. The method of claim 8, wherein the initiation event is the occurrence of a predetermined time.

10. The method of claim 8, further comprising:
closing a window in which the selected instance of advertisement content is rendered at a predetermined time after the initiation event.

11. The method of claim 8, wherein the selected instance of advertisement content further comprises audio advertisement content and the method further comprises:
initiating output of the audio advertisement content in conjunction with display of the instance of advertisement content upon the occurrence of the initiation event.

12. The method of claim 1, wherein the generated advertisement impression is generated by:
selecting an instance of advertisement content from a plurality of instances of advertisement content; and
combining the selected instance of advertisement content with the pointer tracking instructions.

13. A client rendering system comprising:
a processor; and
a memory containing instructions that, when executed, cause the processor to:
receive an advertisement impression, wherein the advertisement impression comprises a selected instance of advertisement content and pointer tracking instructions;
generate, in a window on the client rendering system, the advertisement impression, wherein the advertisement impression is positioned at a first location in the window that is independent of a current location of a mouse pointer;
reposition the advertisement impression at a second location in response to detecting user movement of the mouse pointer, wherein the advertisement content includes a selectable item; and
decouple the mouse pointer from movement of the mouse pointer to enable selection of the selectable item.

14. The client rendering system of claim 13, wherein:
each of the plurality of instances of advertisement content is associated with an advertisement category identifier; and
the selected instance of advertisement content is one of the plurality of instances of advertisement content that is both associated with an advertisement category identifier meeting selection criteria and a financial parameter meeting selection criteria.

15. The client rendering system of claim 14, wherein the instance of advertisement content is associated with response data, wherein the response data is response content in the form of a coupon and instructions to initiate printing of the coupon on the client rendering system.

16. The client rendering system of claim 15 wherein:
the selected instance of advertisement content is combined with a unique impression identifier;
the response content is in the form of a coupon that includes the unique impression identifier thereon when the coupon is printed; and
the selected instance of advertisement content is associated with an assessment event, the assessment event comprises use of the coupon in a transaction, the coupon being identified by its unique impression identifier.

17. The client rendering system of claim 13, wherein the instance of advertisement content is associated with response data, wherein the response data includes response content in the form of a right click menu; and the instructions further cause the processor to:
render the right click menu on the client rendering system; and
decouple the mouse pointer from movement of the mouse pointer to enable selection of a menu choice from the right click menu.

18. The client rendering system of claim 17, wherein the response content further includes a coupon and instructions to initiate printing of the coupon on the client rendering system in response to selection of a print coupon choice from the right click menu.

19. The client rendering system of claim 18 wherein:
the selected instance of advertisement content is combined with a unique impression identifier;
the response content is in the form of a coupon that includes the unique impression identifier thereon when the coupon is printed; and the instance of advertisement content is associated with an assessment event, the assessment event comprises use of the coupon in a transaction, the coupon being identified by its unique impression identifier.

20. The client rendering system of claim 13, wherein each of the plurality of instances of advertisement content is associated with initiation data, the initiation data effective to delay the rendering of the selected instance of advertisement content on the client rendering system until the occurrence of an initiation event.

21. The client rendering system of claim 20, wherein the initiation event is the occurrence of a predetermined time.

22. The client rendering system of claim 20, wherein the instructions further cause the processor to:
close a window in which the selected instance of advertisement content is rendered at a predetermined time after the initiation event.

23. The client rendering system of claim 20, wherein:
the selected instance of advertisement content further comprises audio advertisement content; and the instructions further cause the processor to initiate output of the audio advertisement content in conjunction with display of the instance of advertisement content upon the occurrence of the initiation event.

24. The client rendering system of claim 13, wherein selected instance of advertisement content is received in response to sending an advertisement request.

* * * * *